United States Patent
Suvanen

(10) Patent No.: US 6,320,880 B1
(45) Date of Patent: Nov. 20, 2001

(54) METHOD FOR SYNCHRONIZATION

(75) Inventor: Jyri Suvanen, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/198,166

(22) Filed: Nov. 23, 1998

Related U.S. Application Data

(63) Continuation of application No. PCT/FI98/00254, filed on Mar. 23, 1998.

(51) Int. Cl.[7] .................................................. H04J 3/06
(52) U.S. Cl. .................................... 370/512; 375/356
(58) Field of Search .................................. 370/503, 507, 370/509, 510, 512; 375/354, 356

(56) References Cited

U.S. PATENT DOCUMENTS

| | | | |
|---|---|---|---|
| 5,177,740 | * 1/1993 | Toy et al. | 370/337 |
| 5,687,199 | 11/1997 | Dupuy | 375/354 |
| 5,892,802 | * 4/1999 | Jung et al. | 375/354 |
| 5,933,468 | * 8/1999 | Kingdon | 375/362 |
| 5,956,377 | * 9/1999 | Lang | 375/372 |
| 5,966,374 | * 10/1999 | Rasanen | 370/337 |
| 6,041,230 | * 3/2000 | Siira | 455/422 |
| 6,125,120 | * 9/2000 | Lehtimaki | 370/435 |
| 6,134,242 | * 10/2000 | Aftelak | 370/465 |
| 6,172,968 | * 1/2001 | Rasanen | 370/329 |

FOREIGN PATENT DOCUMENTS

| | | |
|---|---|---|
| 6209311 | 7/1994 | (JP) . |
| 94-276707 | 7/1994 | (JP) . |

OTHER PUBLICATIONS

"Recommendation V.110"; International Telecommunication Union; The International Telegraph and Telephone Consultative Committee; 1993; pp. 1–58.

Mouly, M. & M. Pautet. "The GSM System for Mobile Communications"; Palaiseau, France; 1992; ISBN: 2-9507190-0-7; cover pages only.

* cited by examiner

Primary Examiner—Ricky Ngo
Assistant Examiner—Phuc Tran
(74) Attorney, Agent, or Firm—Altera Law Group, LLC

(57) ABSTRACT

The invention relates to a synchronization method in a telecommunication system that includes a transmitting unit, a receiving unit and a transmission link between these two. The information to be transmitted in the telecommunication system is transferred from the transmitting unit to the receiving unit in a data frame that includes an information section and a synchronization section. The bits of the synchronization section are in each consecutive data frame always in the same state as in the previous data frame, and the synchronization section consists of at least one synchronization bit in a selected logical state. In the method, the transmitting and receiving units of the data frame are mutually synchronized with synchronization bits. According to the invention, the synchronization method is characterized by forming a synchronization frame that includes at least as many synchronization bits as there are bits in the data frame, and the synchronization frame including bits in the same logical state as the data frame synchronization bits of the selected logical state, the number of the bits being no higher than the number of said data frame synchronization bits in the selected logical state, subtracted by one, whereby the other bits in the synchronization frame are in a complement state with regard to the selected logical state, and transferring said synchronization frame over the transmission link to mutually synchronize the transmitting unit and the receiving unit.

10 Claims, 8 Drawing Sheets

Fig. 2

| octet number | bit number |   |   |   |   |   |   |   |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | X | X | X | X | X | X | X |
| 5 | 1 | X | X | X | X | X | X | X |
| 6 | 1 | X | X | X | X | X | X | X |
| 7 | 1 | X | X | X | X | X | X | X |
| 8 | 1 | X | X | X | X | X | X | X |
| 9 | 1 | X | X | X | X | X | X | X |
| 10 | 1 | X | X | X | X | X | X | X |
| 11 | 1 | X | X | X | X | X | X | X |
| 12 | 1 | X | X | X | X | X | X | X |
| 13 | 1 | X | X | X | X | X | X | X |
| 14 | 1 | X | X | X | X | X | X | X |
| 15 | 1 | X | X | X | X | X | X | X |
| 16 | 1 | X | X | X | X | X | X | X |
| 17 | 1 | X | X | X | X | X | X | X |
| 18 | 1 | X | X | X | X | X | X | X |
| 19 | 1 | X | X | X | X | X | X | X |
| 20 | 1 | X | X | X | X | X | X | X |
| 21 | 1 | X | X | X | X | X | X | X |
| 22 | 1 | X | X | X | X | X | X | X |
| 23 | 1 | X | X | X | X | X | X | X |
| 24 | 1 | X | X | X | X | X | X | X |
| 25 | 1 | X | X | X | X | X | X | X |
| 26 | 1 | X | X | X | X | X | X | X |
| 27 | 1 | X | X | X | X | X | X | X |
| 28 | 1 | X | X | X | X | X | X | X |
| 29 | 1 | X | X | X | X | X | X | X |
| 30 | 1 | X | X | X | X | X | X | X |
| 31 | 1 | X | X | X | X | X | X | X |
| 32 | 1 | X | X | X | X | X | X | X |
| 33 | 1 | X | X | X | X | X | X | X |
| 34 | 1 | X | X | X | X | X | X | X |
| 35 | 1 | X | X | X | X | X | X | X |
| 36 | 1 | X | X | X | X | X | X | X |
| 37 | 1 | X | X | X | X | X | X | X |
| 38 | 1 | X | X | X | X | X | X | X |
| 39 | 1 | X | X | X | X | X | X | X |

Fig. 3

| octet number | bit number 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | S1 | S2 |
| 4 | D1 | D2 | X | X | X | X | X | X |
| 5 | X | X | X | X | X | X | X | X |
| 6 | X | X | X | X | X | X | X | X |
| 7 | X | X | X | X | X | X | X | X |
| 8 | X | X | X | X | X | X | X | X |
| 9 | X | X | X | X | X | X | X | X |
| 10 | X | X | X | X | X | X | X | X |
| 11 | X | X | X | X | X | X | X | X |
| 12 | X | X | X | X | X | X | X | X |
| 13 | X | X | X | X | X | X | X | X |
| 14 | X | X | X | X | X | X | X | X |
| 15 | X | X | X | X | X | X | X | X |
| 16 | X | X | X | X | X | X | X | X |
| 17 | X | X | X | X | X | X | X | X |
| 18 | X | X | X | X | X | X | X | X |
| 19 | X | X | X | X | X | X | X | X |
| 20 | X | X | X | X | X | X | X | X |
| 21 | X | X | X | X | X | X | X | X |
| 22 | X | X | X | X | X | X | X | X |
| 23 | X | X | X | X | X | X | X | X |
| 24 | X | X | X | X | X | X | X | X |
| 25 | X | X | X | X | X | X | X | X |
| 26 | X | X | X | X | X | X | X | X |
| 27 | X | X | X | X | X | X | X | X |
| 28 | X | X | X | X | X | X | X | X |
| 29 | X | X | X | X | X | X | X | X |
| 30 | X | X | X | X | X | X | X | X |
| 31 | X | X | X | X | X | X | X | X |
| 32 | X | X | X | X | X | X | X | X |
| 33 | X | X | X | X | X | X | X | X |
| 34 | X | X | X | X | X | X | X | X |
| 35 | X | X | X | X | X | X | X | X |
| 36 | X | X | X | X | X | X | X | X |
| 37 | X | X | X | X | X | X | X | X |
| 38 | X | X | X | X | X | X | X | X |
| 39 | X | X | X | X | X | X | D287 | D288 |

Fig. 4

| octet number | bit number 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | 1 | 1 | 1 | 1 | 1 | 1 | 1 |
| 5 | 1 | 1 | 1 | 1 | 1 | 1 | 1 | 1 |
| 6 | 1 | 1 | 1 | 1 | 1 | 1 | 1 | 1 |
| 7 | 1 | 1 | 1 | 1 | 1 | 1 | 1 | 1 |
| 8 | 1 | 1 | 1 | 1 | 1 | 1 | 1 | 1 |
| 9 | 1 | 1 | 1 | 1 | 1 | 1 | 1 | 1 |
| 10 | 1 | 1 | 1 | 1 | 1 | 1 | 1 | 1 |
| 11 | 1 | 1 | 1 | 1 | 1 | 1 | 1 | 1 |
| 12 | 1 | 1 | 1 | 1 | 1 | 1 | 1 | 1 |
| 13 | 1 | 1 | 1 | 1 | 1 | 1 | 1 | 1 |
| 14 | 1 | 1 | 1 | 1 | 1 | 1 | 1 | 1 |
| 15 | 1 | 1 | 1 | 1 | 1 | 1 | 1 | 1 |
| 16 | 1 | 1 | 1 | 1 | 1 | 1 | 1 | 1 |
| 17 | 1 | 1 | 1 | 1 | 1 | 1 | 1 | 1 |
| 18 | 1 | 1 | 1 | 1 | 1 | 1 | 1 | 1 |
| 19 | 1 | 1 | 1 | 1 | 1 | 1 | 1 | 1 |
| 20 | 1 | 1 | 1 | 1 | 1 | 1 | 1 | 1 |
| 21 | 1 | 1 | 1 | 1 | 1 | 1 | 1 | 1 |
| 22 | 1 | 1 | 1 | 1 | 1 | 1 | 1 | 1 |
| 23 | 1 | 1 | 1 | 1 | 1 | 1 | 1 | 1 |
| 24 | 1 | 1 | 1 | 1 | 1 | 1 | 1 | 1 |
| 25 | 1 | 1 | 1 | 1 | 1 | 1 | 1 | 1 |
| 26 | 1 | 1 | 1 | 1 | 1 | 1 | 1 | 1 |
| 27 | 1 | 1 | 1 | 1 | 1 | 1 | 1 | 1 |
| 28 | 1 | 1 | 1 | 1 | 1 | 1 | 1 | 1 |
| 29 | 1 | 1 | 1 | 1 | 1 | 1 | 1 | 1 |
| 30 | 1 | 1 | 1 | 1 | 1 | 1 | 1 | 1 |
| 31 | 1 | 1 | 1 | 1 | 1 | 1 | 1 | 1 |
| 32 | 1 | 1 | 1 | 1 | 1 | 1 | 1 | 1 |
| 33 | 1 | 1 | 1 | 1 | 1 | 1 | 1 | 1 |
| 34 | 1 | 1 | 1 | 1 | 1 | 1 | 1 | 1 |
| 35 | 1 | 1 | 1 | 1 | 1 | 1 | 1 | 1 |
| 36 | 1 | 1 | 1 | 1 | 1 | 1 | 1 | 1 |
| 37 | 1 | 1 | 1 | 1 | 1 | 1 | 1 | 1 |
| 38 | 1 | 1 | 1 | 1 | 1 | 1 | 1 | 1 |
| 39 | 1 | 1 | 1 | 1 | 1 | 1 | 1 | 1 |

Fig. 5

| octet number | bit number 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | D1 | X | X | X | X | X | X |
| 2 | 1 | X | X | X | X | X | X | X |
| 3 | 1 | X | X | X | X | X | X | X |
| 4 | 1 | X | X | X | X | X | X | X |
| 5 | 1 | X | X | X | X | X | X | X |
| 6 | 1 | X | X | X | X | X | X | X |
| 7 | 1 | X | X | X | X | X | X | X |
| 8 | 1 | X | X | X | X | X | X | X |
| 9 | 1 | X | X | X | X | X | X | X |

Fig. 6

| octet number | bit number 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | 1 | 1 | 1 | 1 | 1 | 1 | 1 |
| 2 | 1 | 1 | 1 | 1 | 1 | 1 | 1 | 1 |
| 3 | 1 | 1 | 1 | 1 | 1 | 1 | 1 | 1 |
| 4 | 1 | 1 | 1 | 1 | 1 | 1 | 1 | 1 |
| 5 | 1 | 1 | 1 | 1 | 1 | 1 | 1 | 1 |
| 6 | 1 | 1 | 1 | 1 | 1 | 1 | 1 | 1 |
| 7 | 1 | 1 | 1 | 1 | 1 | 1 | 1 | 1 |
| 8 | 1 | 1 | 1 | 1 | 1 | 1 | 1 | 1 |
| 9 | 1 | 1 | 1 | 1 | 1 | 1 | 1 | 1 |

Fig. 7

| octet number | bit number | | | | | | | |
|---|---|---|---|---|---|---|---|---|
| | 1 | 2 | 3 | 4 | 5 | 6 | 7 | 8 |
| 0 | 1 | 0 | 0 | 0 | UFE/1 | H | M | D1 |
| 1 | 0 | D2 | D3 | D4 | D5 | D6 | D7 | D8 |
| 2 | D9 | D10 | D11 | D12 | D13 | D14 | D15 | D16 |
| 3 | D17 | D18 | D19 | D20 | D21 | D22 | D23 | D24 |
| 4 | D25 | D26 | D27 | D28 | D29 | D30 | D31 | D32 |
| 5 | D33 | D34 | D35 | D36 | D1' | D2' | D3' | D4' |
| 6 | D5' | D6' | D7' | D8' | D9' | D10' | D11' | D12' |
| 7 | D13' | D14' | D15' | D16' | D17' | D18' | D19' | D20' |
| 8 | D21' | D22' | D23' | D24' | D25' | D26' | D27' | D28' |
| 9 | D29' | D30' | D31' | D32' | D33' | D34' | D35' | D36' |

Fig. 8

| octet number | bit number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |

Fig. 9

| octet number | bit number | | | | | | | |
|:---:|:---:|:---:|:---:|:---:|:---:|:---:|:---:|:---:|
| | 1 | 2 | 3 | 4 | 5 | 6 | 7 | 8 |
| 0 | 0 | 1 | 1 | 1 | UFE/1 | H | M | D1 |
| 1 | 1 | D2 | D3 | D4 | D5 | D6 | D7 | D8 |
| 2 | D9 | D10 | D11 | D12 | D13 | D14 | D15 | D16 |
| 3 | D17 | D18 | D19 | D20 | D21 | D22 | D23 | D24 |
| 4 | D25 | D26 | D27 | D28 | D29 | D30 | D31 | D32 |
| 5 | D33 | D34 | D35 | D36 | D1' | D2' | D3' | D4' |
| 6 | D5' | D6' | D7' | D8' | D9' | D10' | D11' | D12' |
| 7 | D13' | D14' | D15' | D16' | D17' | D18' | D19' | D20' |
| 8 | D21' | D22' | D23' | D24' | D25' | D26' | D27' | D28' |
| 9 | D29' | D30' | D31' | D32' | D33' | D34' | D35' | D36' |

Fig. 10

| octet number | bit number | | | | | | | |
|:---:|:---:|:---:|:---:|:---:|:---:|:---:|:---:|:---:|
| | 1 | 2 | 3 | 4 | 5 | 6 | 7 | 8 |
| 0 | 1 | 1 | 1 | 1 | 1 | 1 | 1 | 1 |
| 1 | 1 | 1 | 1 | 1 | 1 | 1 | 1 | 1 |
| 2 | 1 | 1 | 1 | 1 | 1 | 1 | 1 | 1 |
| 3 | 1 | 1 | 1 | 1 | 1 | 1 | 1 | 1 |
| 4 | 1 | 1 | 1 | 1 | 1 | 1 | 1 | 1 |
| 5 | 1 | 1 | 1 | 1 | 1 | 1 | 1 | 1 |
| 6 | 1 | 1 | 1 | 1 | 1 | 1 | 1 | 1 |
| 7 | 1 | 1 | 1 | 1 | 1 | 1 | 1 | 1 |
| 8 | 1 | 1 | 1 | 1 | 1 | 1 | 1 | 1 |
| 9 | 1 | 1 | 1 | 1 | 1 | 1 | 1 | 1 |

METHOD FOR SYNCHRONIZATION

This is a continuation under 35 U.S.C. 111(a). of PCT/FI98/00254, international filing date Mar. 23, 1998.

FIELD OF THE INVENTION

The present invention relates to a synchronization method in a telecommunication system, advantageously in a cellular radio system.

BACKGROUND OF THE INVENTION

The transfer capacity required in data transfer is continuously increasing, particularly in cellular radio Systems In the pan-European GSM mobile communications system, for example, there is need, in addition to the presently-used data transfer rates of 9.6 kbit/s and 4.8 kbit/s, for higher transfer rates, such as 14.4 kbit/s, which is required by data services of the public switched telephone network PSTN, for example the modem and telefax terminals of class G3.

FIG. 1 in the accompanying drawing shows a simplified block diagram of the pan-European GSM mobile communications system. The network subsystem (NSS) comprises a mobile services switching centre MSC which communicates with other mobile services switching centres, and either directly or via the system interface of a gateway mobile services switching centre (GMSC), the mobile communications system is connected to other networks, such as the public switched telephone network (PSTN), an integrated services digital network (ISDN), other mobile communications networks such as the public land mobile network (PLMN) and packet-switched public data networks (PSPDN) and circuit-switched public data networks (CSPDN). The mobile services switching centre comprises network interworking functions (IWF) by means of which the GSM network can be adapted to other networks. The IWF comprises an echo cancellation part, modems for modulating the signal originating from the mobile communications network as required before sending it over the system interface to other networks and, correspondingly, for demodulating the signal received from other networks into a PCM signal. In addition, the IWF comprises rate adaptation for adapting the transfer rate to be suitable for other networks, and, correspondingly, for adapting the signal rate from other networks for the GSM network. The network subsystem NSS is connected via the A-interface to the base station subsystem (BSS) which comprises base station controllers BSC, each controlling the base stations BTS that are connected to them. The interface between the BSC and the base stations BTS connected thereto is the Abis interface. The base stations BTS for their part communicate on the radio path with mobile stations MS over the radio interface.

The transcoder/rate adaptor unit (TRAU) is a part of the base station subsystem BSS and may be located at the base station controller BSC, as shown in FIG. 1, or alternatively at the mobile services switching centre MAC. The transcoders convert speech from a digital format to another, for example 64 kbit/s PCM received over the A-interface from the MSC, into data to be transmitted to the base station, and vice versa. One 64 kbit/s PCM channel carries four speech/data connections, which means that the rate of one speech/data channel on this link is 16 kbit/s.

In FIG. 1, between the MS and the data terminal 12, here represented by a PC, there is the TAF block (Terminal Adaptation Function) whose function is to carry out the adaptation between the data terminal 12 and the radio sections of the MS so that the bit stream originating from the terminal equipment is adapted to the radio path. The mobile station MS connected to the data terminal 12 transmits user data over the radio interface on the radio channel at 9.6 kbit/s or 4.8 kbit/s, as specified in the standard. The base station BTS receives the data of the traffic channel and transfers it to the 64 kbit/s timeslot of the PCM circuit. In addition, the three other traffic channels of the same carrier are inserted into the same timeslot, i.e. channel, resulting in that the transfer rate per connection is 16 kbit/s. At the BSC, the TRAU converts the coded 16 kbit/s digital information into the 64 kbit/s channel, and on this channel the data is transferred into the IWF unit at the MSC. The IWF carries out the necessary modulation and rate adaptation, after which the data is transmitted to some other network. Thus, user data is transferred over fixed connections in the uplink direction from the BTS to the BSC and the MSC, and correspondingly, the data to be transmitted to the MS is transferred in the downlink direction from the MSC via the BSC to the BTS and from thereon over the radio interface to the MS. The channel codec unit (CCU) of the base station carries out the conversion of the signal received on the radio channel into the channel of the PCM timeslot in the trunk circuit over the Abis interface, and the conversion of the signal received over the Abis interface into the form transmitted to the radio path. The TRAU carries out the conversion operations for the signals to be transferred over the A-interface.

The user data is transferred over the Abis; interface from the BTS to the TRAU in a fixed-length TRAU frame. The TRAU frame comprises 40 octets numbered 0, . . . ,39, its total length thus being 320 bits and duration 20 ms. FIG. 2 shows in bit diagram form a TRAU data frame used to transfer a signal at the data rate of 9.6 kbit/s or 4.8 kbit/s. Synchronization between the unit that transmits the TRAU frame and the one that receives it is achieved with synchronization bits that are shown in FIG. 2 as 0-bits and 1-bits. The 0-bits in the first two octets of the TRAU data frame are used for carrying out the actual synchronization, and the 1-bits in the first bit position in the other octets except the first, second, and fourth, are used to ensure that elsewhere in the data frame there are no two-octet-long sequences of successive 0-bits that would look like a synchronization sequence. The TRAU frame of FIG. 2 shows control bits C1–C15, and the user data bits denoted with X. Control bit C6 is used to transfer information on the data rate, such as 8 kbit/s or 16 kbit/s. In the figure, the octets containing user data are separated by dotted lines into sections containing 63 data bits, the total length of such a section, including the synchronization bits, being 72 bits. Unused data bits are set to 1-state, for example, for the duration of breaks in the data transmission.

The TRAU frame according to FIG. 2 is as such unsuitable for transfer of signals at 14.4 kbit/s, because 288 data bits would have to be inserted into one frame. For such data transfer, an extended TRAU data frame has been proposed whose structure is shown by FIG. 3. An extended TRAU data frame is also suitable for transfer of signals at 7.2 kbit/s. In FIG. 3, the user data bits D3–D286 are for the sake of simplicity marked with X. The 288 bits in a 14.4 kbit/s data rate signal are thus inserted into user data bits D1–D288. So, the synchronization bits in the first bit position of octets 4–39 in the normal TRAU data frame have been replaced by user data bits in the extended TRAU frame, and the control bits C14 and C15 have been replaced by bits S1 and S2. In non-transparent data, the S1 bit is used to carry information on the number of the half in multiframe transmission, and the S2 bit is used to convey information on discontinuous transmission DTX, and for transparent data the S bits indicate the multiframe numbering. As it has been necessary to reduce the number of synchronization bits in the extended TRAU data frame, a synchronization frame formed from a normal TRAU data frame of FIG. 2 by setting the user data bits to 1-state is used in a separate synchronization procedure, to be described below, in order to ensure synchronization when 7.2 and 14.4 kbit/s signals are transferred. FIG. 4 shows a synchronization frame thus formed. In the synchronization procedure, the channel codec unit CCU of the base station BTS transmits at the beginning of a 7.2 or 14.4 kbit/s transmission a synchronization frame of FIG. 4 to the TRAU, the control bits of the synchronization frame indicating the frame type used, e.g. extended 14.4 kbit/s or extended 7.2 kbit/s. The transcoder TRAU responds with an identical synchronization frame, after which the CCU begins the actual transmission by transmitting an extended TRAU data frame. Data transfer continues to both directions by transmitting extended TRAU data frames. In addition, the synchronization frames are transmitted as described above when the data rate on the traffic channel changes during the transmission from another data rate to the rate of 7.2 or 14.4 kbit/s.

For data transfer to be successful, the transmitting and receiving units must be mutually synchronized. In the transfer of TRAU frames, the transcoder unit TRAU receives its synchronization from the BTS. In case the synchronization is lost in the middle of data transfer, the transcoder TRAU transmits information on it to the BTS in the TRAU frame to be transmitted next by using an Uplink Frame Error (UFE) parameter. The UFE parameter is disclosed to be inserted into control bit C6 in the extended TRAU frame, the control bit C6 being in 1-state during normal synchronization and in 0-state when synchronization in the uplink direction hag been lost. The channel codec unit at the BTS reacts to receiving the UFE parameter by transmitting a synchronization frame to the TRAU, acknowledged by the TRAU by a corresponding synchronization frame. If the CCU detects synchronization loss in the downlink direction, it starts a corresponding synchronization procedure.

User data at 9.6 kbit/s and 4.8 kbit/s in the transmission line between the IWF of the MSC and the TRAU unit in the BSS is normally transferred in an 80-bit V.110 frame according to the ITU-T Recommendation V.110, the structure of such a frame being shown in FIG. 5. The frame comprises 10 octets numbered 0, . . . , 9. At the transfer rate of 16 kbit/s, the frame duration is 5 ms. The bits of the first octet and the first bit of every octet are synchronization bits. The 0-bits in the first octet constitute the actual frame synchronization, and as in a TRAU frame, the 1-state of the first bit in the other octets is used to ensure that elsewhere in the frame there are no eight successive 0-bits that might be taken for frame synchronization. During breaks in the data transmission, an idle V.110 data frame shown in FIG. 6 is transmitted, all the data bits of which have been set to 1-state. The D1 and X bits in FIG. 5 are data bits, 63 of which can be accommodated by a single V.110 frame. Thus, four V.110 frames are required to transfer the bits of a normal TRAU data frame.

The 4*72 bits to be transferred over the Abis interface in the extended TRAU frame in 14.4 kbit/s user data do not fit into the four V.110 frames of FIG. 5. Draft recommendations disclose the TRAU frame to be also transferred in the 64 kbit/s channel over the A-interface. If, however, it is desired that 16 kbit/s V.110 frames are used to transfer data in this 64 kbit/s channel, the problem arises that an extended V.110 frame cannot be formed in a similar way as the extended TRAU frame was assembled by converting the synchronization bit in the first bit position of the frame octets into a data bit, because the remaining few synchronization bits of a V.110 frame would not be adequate to ensure reliable synchronization. In addition, the synchronization frame formed correspondingly in connection with the imaginary extended V.110 frame according to the synchronization frame used in connection with the extended TRAU frame would be identical to the idle V.110 frame shown in FIG. 6, because the V.110 frames do not include any control bits whatsoever that would indicate the data rate of the information. In such a case, the unit that receives the frame could not distinguish the synchronization of the extended V.110 frame from a normal V.110 idle transmission.

SUMMARY OF THE INVENTION

The purpose of the present invention is to obtain a simple and reliable synchronization method for transferring data rates higher than those presently used, in data frames that have relatively few synchronization bits.

This new type of synchronization is achieved by the inventive method in a telecommunication system that includes a transmitting unit, a receiving unit and a transmission link between these two. The information to be transmitted in the telecommunication system is transferred from the transmitting unit to the receiving unit in a data frame that includes an information section and a synchronization section. The bits of the synchronization section are in each consecutive data frame always in the same state as in the previous data frame, and the synchronization section consists of at least one synchronization bit in a selected logical state. In the method, the transmitting and receiving units of the data frame are mutually synchronized with synchronization bits. According to the invention, the method is characterized by forming a synchronization frame that includes at least as many synchronization bits as there are bits in the data frame, and the synchronization frame containing bits in the same logical state as the data frame synchronization bits of the selected logical state, the number of the bits being no higher than the number of said data frame synchronization bits in the selected logical state, subtracted by one, whereby the other bits in the synchronization frame are in a complement state with regard to the selected logical state, and transferring said synchronization frame over the transmission link to mutually synchronize the transmitting unit and the receiving unit.

The invention is based on the idea of transferring data frames over the transmission line, in which the proportion of synchronization bits is low, and, by using a separate synchronization procedure, a synchronization frame that mainly consists of bits in the same state. The inventive synchronization frame is comprised of at least as many bits as the data frame. The data frame comprises, in addition to the information section, a synchronization section that contains at least one synchronization bit. The bits to be positioned into the synchronization frame are chosen so that it only comprises bits that are in the same logical state, or bits in a selected logical state no more than the number corresponding to the number of bits in this selected logical state in the data frame synchronization section, subtracted by one. With such a form of a synchronization frame it is ensured that the data frame, no matter what its user data contents are, does not resemble a synchronization frame. The present invention is particularly suitable for transferring 14.4 kbit/s user data in a 16 kbit/s channel by using extended V.110 frames and the inventive synchronization frame.

Such a synchronization method provides the advantage that it is simple and its implementation only requires minor changes to the prior art synchronization procedures.

A further advantage of the synchronization method of the invention is that the setting of the synchronization of an extended V.110 frame is explicit and reliable also in various kinds of transmission change situations.

Further still, the synchronization method of the invention provides the advantage that the synchronization frame transferred on a transmission link can easily be recognized as it is always distinguishable from a data frame.

BRIEF DESCRIPTION OF THE DRAWINGS

The invention will now be described in closer detail in connection with its preferred embodiments and with reference to the examples of FIGS. 7–11c in the accompanying drawings, in which:

FIG. 2 shows the structure of a TRAU data frame, FIG. 3 shows the structure of an extended TRAU data frame, FIG. 4 shows the structure of a synchronization frame used in the transmission of an extended TRAU data frame, FIG. 5 shows the structure of a frame according to the Recommendation V.110, FIG. 6 shows the structure of an idle frame according to the Recommendation V.110, FIG. 7 shows the primary embodiment of an extended V.110 frame formed from a frame according to the Recommendation V.110, FIG. 8 shows the primary embodiment of the structure of the inventive synchronization frame used in the transmission of an extended V.110 frame, FIG. 9 shows the secondary embodiment of an extended V.110 frame formed from a frame according to the Recommendation V.110, FIG. 10 shows the secondary embodiment of the structure of the inventive synchronization frame used in the transmission of an extended V.110 frame.

DETAILED DESCRIPTION OF THE INVENTION

Figure 1:
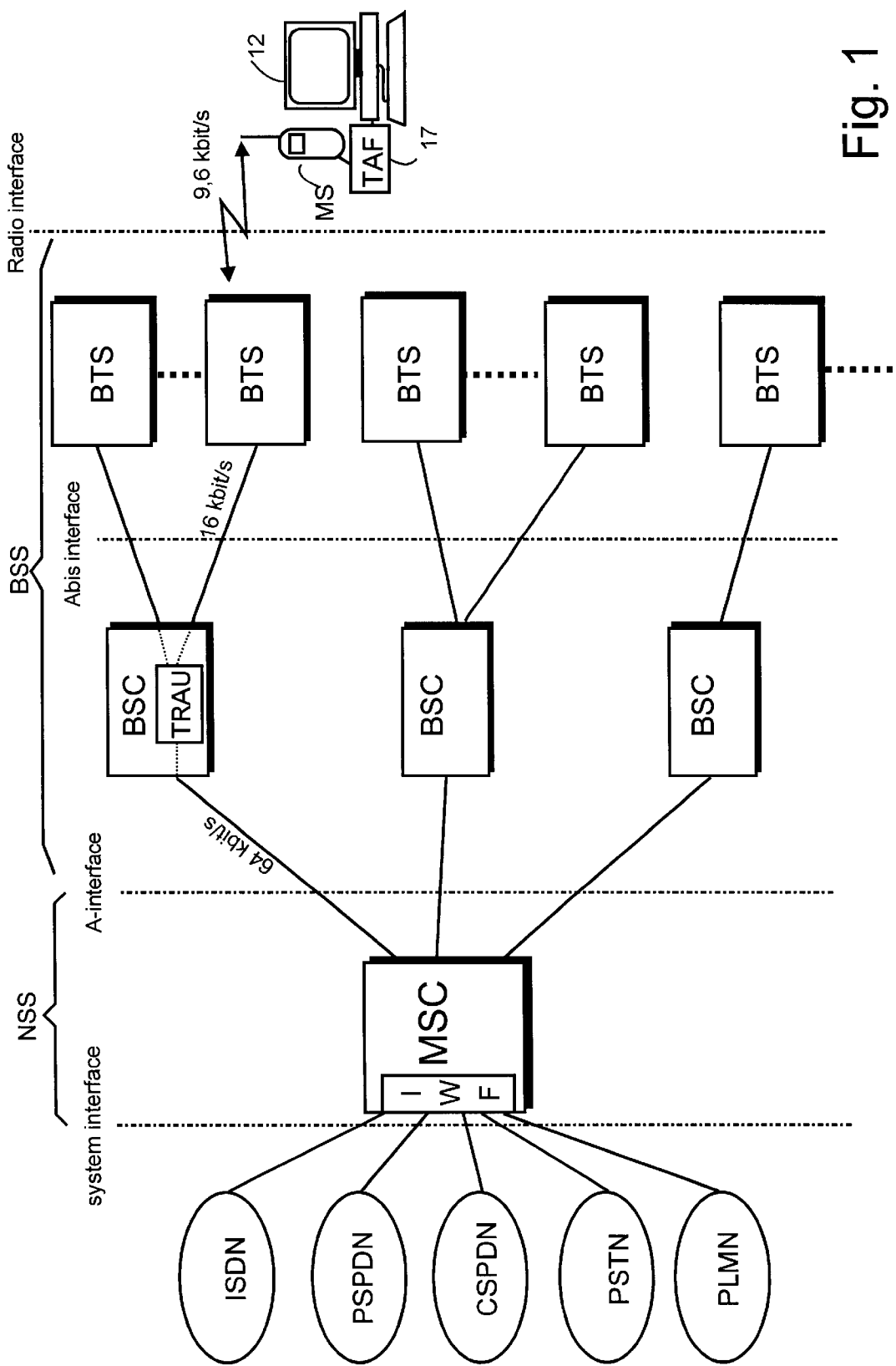
FIG. 1 shows the essential parts of a mobile communications network, from the point of view of the present invention.

The present invention is applicable to any telecommunication system, advantageously a cellular radio system. Below, the invention is described in more detail by way of example primarily in connection with the pan-European digital GSM mobile communications system. FIG. 1 shows the simplified structure of the GSM network, described above. For a close description of the GSM system, reference is made to the GSM Recommendations and "The GSM System for Mobile Communications" by M. Mouly & M. Pautet, Palaiseau, France, 1992, ISBN: 2-9507190-0-7.

In the following, the invention will be described in more detail in the light of its primary embodiment, with reference to FIGS. 7 and 8. FIG. 7 shows an extended V.110 frame suitable for 14.4 kbit/s data transfer, e.g. for transferring data between the transcoder TRAU and the IWF unit at the mobile services switching centre. The extended V.110 frame comprises two 36 data bit sections D1–D36 and D1'–D36', i.e. 72 data bits in all, control bits H and M, an UFE parameter in the downlink direction and, in a corresponding bit position, an 1-bit in the uplink direction, as well as five synchronization bits. Four of such extended V.110 frames can accommodate the 14.4 kbit/s user data of the extended TRAU frame. The UFE parameter is used to send information on synchronization loss in the uplink direction as described above in connection with the prior art description of a TRAU frame. The H-bit is set to 1-state in every fourth extended V.110 frame to indicate the first extended V.110 frame from the four extended V.110 frames formed from the extended TRAU data frame. S1 bit is placed into the M bit when the H-bit is in 1-state, and S2 bit when the H-bit is in 0-state. The S-bits indicate multiframe numbering for transparent data and the half of multiframe transmission and DTX information for non-transparent data, in a similar way as described above in connection with the prior art description.

Of the synchronization bits shown by FIG. 7, four are positioned at the beginning of the first octet and the fifth is placed as the first bit in the second octet. The synchronization bits may also be inserted into the frame in some other way, because as far as frame synchronization is concerned, the only significant matter is that the synchronization bits are located in the same position in successive frames. The number of synchronization bits in other embodiments is set to conform to the frame but nevertheless so that the synchronization section comprises at least one synchronization bit. In the exemplary case of FIG. 7, one of the synchronization bits is in 1-state and the others in 0-state. In the exemplary case of FIG. 7, the bit in the 1-state in the synchronization section is selected as the sign bit on the basis of which the structure of the inventive synchronization frame is determined.

FIG. 8 shows a synchronization frame according to the invention, used in a separate synchronization procedure to synchronize the transmission of the extended V.110 frame shown in FIG. 7. The synchronization frame of the invention comprises bits in the same logical state as the sign bit selected from the synchronization section in the extended V.110 frame, the total number of these bits not exceeding the number that corresponds to the number of synchronization bits of the same logical state as the sign bit in the synchronization section of the extended V.110 frame, subtracted by one. In the case of FIG. 7, the synchronization section of the extended V.110 frame does not have other synchronization bits in the same 1-state as the selected sign bit; accordingly there may be no bits in 1-state in the synchronization frame, but all the bits of the synchronization frame are in 0-state. The synchronization frame according to the invention comprises at least as many bits as the extended V.110 frame, advantageously the synchronization frame comprises as many bits as the extended V.110 frame, and consequently the synchronization frame never looks like an extended V.110 frame or a normal V.110 frame, but these frames always differ from each other. The long synchronization frame thus formed guarantees reliable synchronization for the connection, as it is impossible for a pattern comprising 80 successive 0-bits as in FIG. 8 to ever appear in an extended or normal V.110 frame. When e.g. the TRAU or IWF receives 80 successive 0-bits, it is obviously a synchronization frame of FIG. 8 that is received.

FIG. 9 shows an extended V.110 frame according to the secondary embodiment of the invention, corresponding to the extended V.110 frame according to the primary embodiment of FIG. 7 disclosed above, except for the synchronization section. The synchronization section in the extended V.110 frame of FIG. 9 comprises one synchronization bit in 0-state and four synchronization bits in 1-state. In the exemplary case of FIG. 9, the only 0-bit in the synchronization section is selected as the sign bit, on the basis of which the synchronization frame of FIG. 10 cannot have any bits in 0-state, but all the bits in the synchronization frame are in 1-state. Again, the synchronization frame and the extended V.110 frame as well as the normal V.110 are always easily recognizable on the basis of the bit structure.

In other embodiments of the invention, the synchronization section of the extended V.110 frame can be carried out e.g. by setting more than one of the synchronization bits to 1-state, selected as the state of the sign bit. If two of the synchronization bits are set to 1-state, the synchronization frame of the invention is formed by setting one of the bits to 1-state and the other bits to 0-state or by setting all the bits to 0-state. If a synchronization bit in 0-state has been selected as the sign bit it is similarly possible to set e.g. two of the bits in the synchronization section of the extended V.110 frame to 0-state, whereby the inventive synchronization frame is formed by setting one of the bits to 0-state and the other bits to 1-state or by setting all the bits to 1-state. All of the synchronization bits in the synchronization section of the extended V.110 frame may also be in the same logical state.

The transmission link is synchronized at the beginning of the connection with the inventive synchronization frame as in prior art by transmitting an inventive synchronization frame from the synchronization master unit, such as the transcoder TRAU, to the receiving unit in the network, e.g. the IWF unit at the mobile services switching centre. The unit that receives the synchronization frame transmits a synchronization frame of a corresponding form back to the master unit in order to acknowledge the synchronization, after which the master unit transmits an extended V.110 frame comprising user data. The extended V.110 frames are transferred on the transmission link until one of the units taking part in the transfer detects loss of synchronization, for example during a handover in the mobile communications system, after which a resynchronization of the link is carried out. The resynchronization in the synchronization method of the invention may be activated e.g. by transmitting an inventive synchronization frame or by setting the UFE parameter to 0-state in the downlink direction.

Figure 11A:
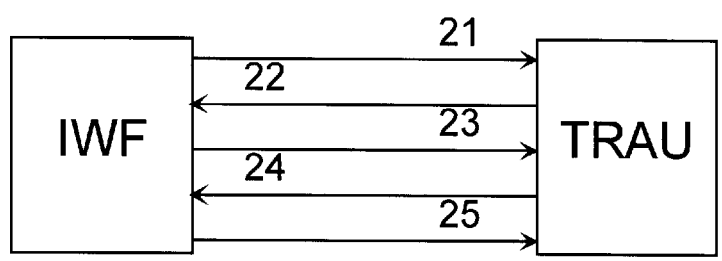
FIGS. 11a–11c show the resynchronization procedure between the transcoder TRAU and the network interworking function IWF.
Figure 11B:
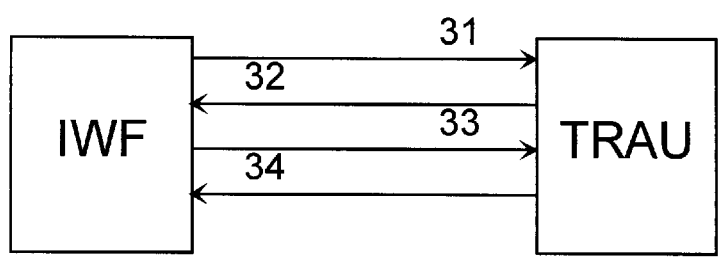
Figure 11C:
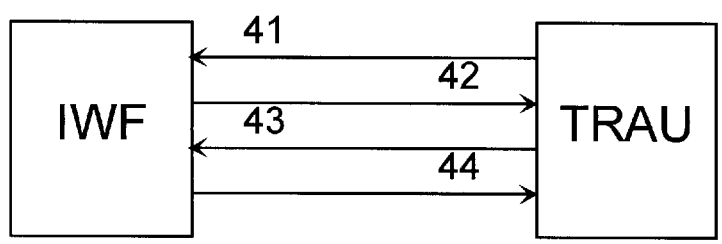

FIGS. 11a–11c show various methods to carry out resynchronization on the connection between the transcoder TRAU and the IWF unit. In the example of FIG. 11a, the IWF detects loss of synchronization in the uplink direction and, at step 21, transmits an extended V.110 frame to the TRAU, the UFE parameter of the frame having been set to 0-state. The TRAU reacts to the information it has received by transmitting an inventive synchronization frame at step 22 to the IWF which acknowledges the synchronization by transmitting an identical synchronization frame to the TRAU at step 23. After this, transmission may continue with extended V.110 frames (steps 24 and 25).

In the example of FIG. 11b, the IWF detects loss of uplink synchronization and, at step 31, transmits an inventive TRAU frame to the TRAU. The TRAU responds to the received information by transmitting an inventive synchronization frame to the IWF at step 32, after which transmission may continue with extended V.110 frames (steps 33 and 34).

In the example of FIG. 11c, the TRAU detects loss of downlink synchronization and, at step 41, transmits an inventive synchronization frame to the IWF which the IWF acknowledges by transmitting an identical synchronization frame to the TRAU at step 42. After this, transmission may continue with extended V.110 frames (steps 43 and 44).

The resynchronization according to the invention by means of the synchronization frame of the invention is carried out utilizing one of the methods described above even when the transmission of normal V.110 frames is in the middle of the transmission replaced by transmission of extended V.110 frames, e.g. when the transfer rate of user data is converted from another rate to 14.4 kbit/s. The conversion from transmitting extended V.110 frames to transmitting normal V.110 frames is performed e.g. when the user data is converted from a 14.4 kbit/s signal to a 9.6 kbit/s signal. In such a case, the transcoder TRAU begins to transmit normal V.110 frames in the middle of the connection, to which the IWF reacts by setting the UFE parameter to 0-state in order to indicate loss of synchronization. The transcoder TRAU still transmits normal V.110 frames to the IWF. When the IWF finds the normal V.110 frame synchronization, it begins to transmit V.110 frames back to the TRAU. After this, data transfer continues with normal V.110 frames.

The drawings and the associated description are only intended to illustrate the idea of the invention. Synchronization according to the invention may vary in details within the scope of the claims. Although the invention is above explained mainly in association with data transfer between the transcoder TRAU and the interworking function IWF of the mobile services switching centre, it is applicable to other kinds of data transfer between two units in a network. The invention is suitable for data transfer at other data rates than 14.4 kbit/s also over other interfaces than the A-interface of the examples above.

What is claimed is:

1. A synchronization method in a telecommunication system that includes a transmitting unit, a receiving unit and a transmission link between these two, the method comprising:

transferring information to be transmitted in the telecommunication system from a transmitting unit to a receiving unit in a data frame that includes an information section and a synchronization section, wherein the bits of the synchronization section being in each consecutive data frame always in the same state as in a previous data frame, including in the synchronization section at least one synchronization bit in a selected logical state, mutually synchronizing the transmitting and receiving units of the data frame with synchronization bits, wherein forming a synchronization frame that includes at least as many synchronization bits as there are bits in the data frame, and the synchronization frame including bits in the same logical state as the data frame synchronization bits of the selected logical state, the number of the bits being no higher than the number of the data frame synchronization bits in the selected logical state, subtracted by one, wherein the other bits in the synchronization frame are in a complement state with regard to the selected logical state, and transferring the synchronization frame over the transmission link to mutually synchronize the transmitting unit and the receiving unit.

2. A method as claimed in claim 1, wherein transferring information to be transmitted further comprises:

transmitting a synchronization frame, at the beginning of a connection, from a unit that acts as the synchronization source, and, at synchronization loss, from a unit that detected the loss, wherein transmitting the synchronization frame between the units only once from both the units taking part in the data transfer to synchronize the connection.

3. A method as claimed in claim 1, wherein transferring the information to be transmitted in an 80-bit-long data frame and by forming a synchronization frame comprising 80 bits.

4. A method as claimed in claim 1, wherein forming a synchronization frame that is substantially comprised of synchronization bits in logical 1-state.

5. A method as claimed in claim 1, wherein forming a synchronization frame that is substantially comprised of synchronization bits in logical 0-state.

6. A method as claimed in claim 1, wherein forming a synchronization frame that is only comprised of synchronization bits in logical 1-state.

7. A method as claimed in claim 1, wherein forming a synchronization frame that is only comprised of synchronization bits in logical 0-state.

8. A method as claimed in claim 1, wherein transferring a data frame and said synchronization frame over an A-interface defined for the GSM mobile communications system.

9. A method as claimed in claim 1, wherein transferring a data frame and said synchronization frame between a transcoder/rate adaptor unit (TRAU) and the network interworking function (IWF).

10. A method as claimed in claim 1, wherein transferring a data frame at an information rate of 14.4 k bit/s in a 16 k bit/s channel.

* * * * *